(No Model.)

W. H. COOK.
PUZZLE.

No. 476,980.        Patented June 14, 1892.

WITNESSES
Jno. G. Hinkel
H. S. McArthur

INVENTOR
William H. Cook.
By Foster Freeman
Attorneys

THE NORRIS PETERS CO., PHOTO-LITHO., WASHINGTON, D. C.

UNITED STATES PATENT OFFICE.

WILLIAM H. COOK, OF PHILADELPHIA, PENNSYLVANIA, ASSIGNOR OF ONE-HALF TO EDWARD B. STAGGERS, JR., OF SAME PLACE.

PUZZLE.

SPECIFICATION forming part of Letters Patent No. 476,980, dated June 14, 1892.

Application filed July 22, 1891. Serial No. 400,329. (No model.)

*To all whom it may concern:*

Be it known that I, WILLIAM H. COOK, a citizen of the United States, residing in the city and county of Philadelphia, and State of Pennsylvania, have invented certain new and useful Improvements in Puzzles, of which the following is a specification.

My invention relates to that class of puzzles or games known as "the 15 puzzle," in which there is a box containing a series of equal-sized movable blocks with one vacant space to permit the movement of one block at a time; and my invention consists in providing the box with certain obstructing-plates and in marking the blocks, as fully set forth hereinafter, so as to enable the blocks to be arranged in a peculiar manner and to render such arrangement puzzling and difficult.

Figure 1:
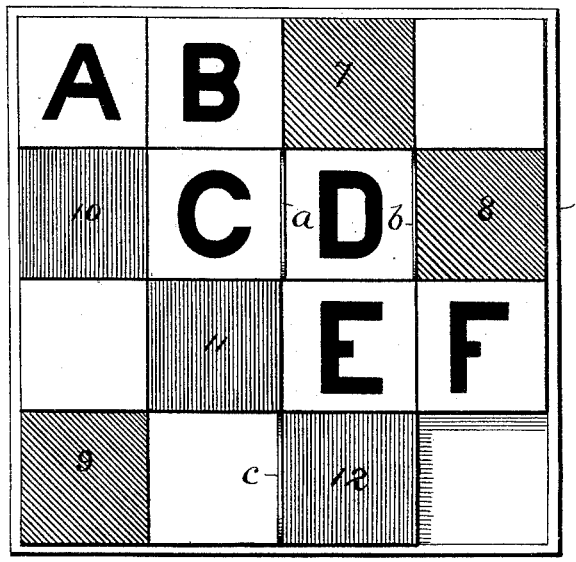
Figure 2:
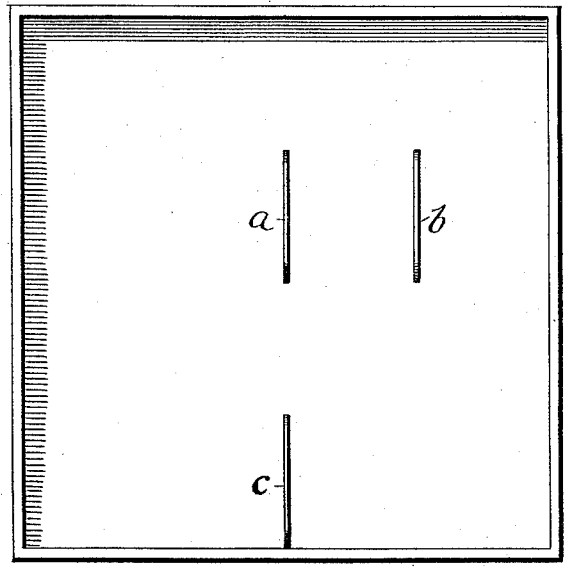

In the accompanying drawings, Figure 1 is a plan view illustrating my improved puzzle; Fig. 2, a plan of the box, the blocks removed.

The box A is rectangular in form, and adapted to receive sixteen square blocks, of which, however, but fifteen are used, so that whenever the blocks are in place in the box there is always one vacant space. Six of the blocks are provided with indicators in series—as, for instance, numerals or letters A B C D E F—and three more of the blocks 7 8 9 are marked with the same color or indicators. As shown, they are distinguished by diagonal lines, while three other blocks 10 11 12 are otherwise marked with a different color or in any other suitable manner—as, for instance, by lines parallel with one of the edges—and the three remaining blocks may be otherwise marked or may be plain without any indicators.

The box A is provided with three narrow obstructing bars or plates *a b c*, the plates *a* and *b* being parallel to each other and occupying positions adjacent to the right and left hand edges of the third block of the second row—that is, the block bearing the indicator D—when arranged as shown in Fig. 1, while the plate *c* occupies a position in line with the plate *a*, adjacent to the left-hand edge of the corresponding third block of the lower row. The game is used by placing the blocks with the indicator-faces uppermost at random in the box and then by successive movements to bring the blocks to the positions indicated in Fig. 1. If there were no obstructing-plates *a b c*, there would be little difficulty in bringing the blocks to the required position; but by arranging these obstructions in the position shown, and by dividing the blocks into three series having different indicators it is possible to finally secure the desired arrangement, whatever may be the random arrangement of the blocks in the first instance.

Without limiting myself to the precise marking of the blocks shown, I claim—

A puzzle consisting of a rectangular box adapted to receive sixteen square blocks, two separated obstructing-plates *a b*, arranged parallel to each other in said box, and a third plate *c*, arranged below and in line with the plate *a*, and fifteen blocks, six marked with a successive number of letters or figures, three marked with a similar color or indicator, and the remaining three with another color or indicator, substantially as and for the purpose set forth.

In testimony whereof I have signed my name to this specification in the presence of two subscribing witnesses.

WILLIAM H. COOK.

Witnesses:
HARRY S. WAITE,
JOHN L. GALLOWAY.